United States Patent [19]

Deboer et al.

[11] Patent Number: 5,683,836
[45] Date of Patent: Nov. 4, 1997

[54] METHOD OF MAKING BLACK MATRIX GRID LINES FOR A COLOR FILTER ARRAY

[75] Inventors: Charles David Deboer, Palmyra; Judith Lynn Fleissig, Rochester; Helmut Weber, Webster; Michael Edgar Long, Bloomfield, all of N.Y.

[73] Assignee: Eastman Kodak Company, Rochester, N.Y.

[21] Appl. No.: 586,105

[22] Filed: Jan. 16, 1996

[51] Int. Cl.$^6$ ..................................................... G02B 5/20
[52] U.S. Cl. ............................................... 430/7; 430/258
[58] Field of Search .............................. 430/7, 256, 258, 430/260, 20

[56] References Cited

U.S. PATENT DOCUMENTS

| | | | |
|---|---|---|---|
| 4,081,277 | 3/1978 | Brault et al. | 96/38.2 |
| 4,541,830 | 9/1985 | Hotta et al. | 8/471 |
| 4,695,286 | 9/1987 | Vanier et al. | 8/471 |
| 4,695,287 | 9/1987 | Evans et al. | 8/471 |
| 4,698,651 | 10/1987 | Moore et al. | 503/227 |
| 4,701,439 | 10/1987 | Weaver et al. | 503/227 |
| 4,740,797 | 4/1988 | Yamamoto et al. | 346/74.4 |
| 4,743,582 | 5/1988 | Evans et al. | 503/227 |
| 4,753,922 | 6/1988 | Byers et al. | 503/227 |
| 4,757,046 | 7/1988 | Byers et al. | 503/227 |
| 4,769,360 | 9/1988 | Evans et al. | 503/227 |
| 4,775,657 | 10/1988 | Harrison et al. | 503/227 |
| 4,923,860 | 5/1990 | Simons | 503/227 |
| 4,957,898 | 9/1990 | Weber | 503/227 |
| 4,962,081 | 10/1990 | Harrison et al. | 503/227 |
| 4,965,242 | 10/1990 | DeBoer et al. | 430/7 |
| 4,973,572 | 11/1990 | DeBoer | 503/227 |
| 4,975,410 | 12/1990 | Weber et al. | 503/227 |
| 4,988,665 | 1/1991 | Weber et al. | 503/227 |
| 5,166,126 | 11/1992 | Harrison et al. | 503/227 |

FOREIGN PATENT DOCUMENTS

| | | |
|---|---|---|
| 4-142501 | 5/1992 | Japan . |
| 2130781 | 2/1983 | United Kingdom . |
| 2161971 | 7/1983 | United Kingdom . |
| 2154355 | 1/1985 | United Kingdom . |
| 2162674 | 6/1985 | United Kingdom . |

*Primary Examiner*—John A. McPherson
*Attorney, Agent, or Firm*—Raymond L. Owens

[57] ABSTRACT

A method of making black matrix grid lines for a color filter array for use with a liquid crystal display device or the like, comprising providing a photo-thermally sensitive black layer over a support layer; exposing a pattern of electromagnetic radiation onto the photo-thermally sensitive black layer corresponding to the desired pattern of the black matrix grid lines; and peeling off the unexposed portions of the photo-thermally sensitive black layer to thereby form the grid lines.

4 Claims, 1 Drawing Sheet

METHOD OF MAKING BLACK MATRIX GRID LINES FOR A COLOR FILTER ARRAY

FIELD OF THE INVENTION

This invention relates to a method for making a black matrix for a color filter array by flashing a pattern onto a photo-thermally sensitive black layer and then removing the unexposed portions of the layer.

BACKGROUND OF THE INVENTION

Liquid crystal display devices are known for digital display in electronic calculators, clocks, household appliances, audio equipment, and their applications. Liquid crystal displays are being developed to replace cathode ray tube technology for display terminals. Liquid crystal displays occupy a smaller volume than cathode ray tube devices with the same screen area. Also, they are lighter than cathode ray tubes, and are therefore useful in portable device displays such as lap-top computers. In addition, liquid crystal display devices usually have lower power and lower voltage requirements than corresponding cathode ray tube devices.

One commercially available type of color filter array element that has been used in liquid crystal display devices for color display capability is a transparent support having a gelatin layer thereon which contains dyes having the additive primary colors red, green and blue in a mosaic pattern obtained by a photolithographic technique. To prepare such a color filter array element a gelatin layer is sensitized, exposed to a mask for one of the colors of the mosaic pattern, developed to harden the gelatin in the exposed areas, and washed to remove the unexposed (uncrosslinked) gelatin, thus producing a pattern of gelatin which is then dyed with dye of the desired color. The element is then recoated and the above steps are repeated to obtain the other two colors. Misalignment or improper deposition of color materials may occur during any of these operations, thus destroying the uniformity of the array, and rendering it useless for display of images. Further details of this type of color filter array and method for making it are disclosed in U.S. Pat. No. 4,081,277.

Color liquid crystal display devices generally include two spaced glass panels which define a sealed cavity that is filled with a liquid crystal material. For actively-driven devices, a transparent electrode is formed on one of the glass panels, which electrode may be patterned or not, while individually addressable electrodes are formed on the other of the glass panels. Each of the individual electrodes has a surface area corresponding to the area of one picture element, or pixel. If the device is to have color capability, each pixel must be aligned with a color area, e.g. red, green, or, blue, of a color filter array. Depending on the image to be displayed, one or more of the pixel electrodes is energized during display operation to permit full light, no light, or partial light to be transmitted through the color filter area associated with that pixel. The image perceived by a user is a blending of colors formed by the transmission of light through adjacent color filter areas. In the display of high quality images, it is important that the pixel elements be highly uniform, both in size and in color. Defects such as drop outs, pixel elements that are always light or always dark, are particularly objectionable. The source of such drop-out pixels is often an electrical short through the liquid crystal material caused by a particle of dust trapped during the steps of coating, patterning, dyeing and washing the color filter array pixels. To avoid these dust particles, most or all the steps of manufacture are carried out in highly filtered "clean room" environments. The extra burdens of operating in a clean room include labor-intensive, time-consuming and very costly process steps.

More subtle variations in uniformity are also deleterious. Variations in size of the color filter array pixels may be visible to the eye in the form of waves or patterns in uniformly colored areas. To avoid these kinds of image defects it is important that color filter array pixels be uniform in size, spacing and color level.

One way to improve the uniformity of a color filter array display is to surround each area of primary color ( pixel element), with an opaque area provided by black grid lines. If the open areas of the black grid lines are of uniform size and distribution, the overall uniformity of the color filter array is improved, even when the colored pixels may be somewhat irregular in size and spacing. In effect, the black matrix hides any irregularities in the color filter pixels. Naturally, the irregularities can only be hidden if they are small, and do not extend into the space occupied by the adjacent color pixel. In addition, the black matrix has been found to give improved color reproduction by reducing flare in the displayed image.

One widely used black matrix in color filter arrays is made by evaporating a thin layer of chromium under high vacuum conditions onto a glass support. The chromium is then patterned by photolithographic techniques. More particularly, the chromium is covered with a layer of photoresist, baked, exposed to an ultra-violet light pattern corresponding to the desired black matrix. The photoresist is developed, dried and baked, and the exposed chromium is etched in an acid solution to remove the chromium in the areas where colored pixels are desired. The large number of steps required for this process and the expensive equipment used in photolithography make this method of preparing a black matrix for a color filter array costly.

Another known method of preparing a black matrix for color filter arrays is by coating a black pigmented layer of photosensitive polymer. The black matrix is then prepared by well known photolithographic process steps of spin coating, baking, exposure to the image pattern, wet development and baking. Again, the large number of steps required for this process and the expensive equipment used in photolithography make this method of preparing a black matrix for a color filter array costly.

SUMMARY OF THE INVENTION

It is an object of this invention to provide a method for preparing color filter arrays that provides an array of pixel elements of uniform size and spacing. It is also desirable that the steps of preparing black matrix grid lines for a color filter array that are low cost and efficient, so that the cost of the produced filter array is low.

This object is achieved in a method of making black matrix grid lines for a color filter array for use with a liquid crystal display device or the like, comprising the steps of:

(a) providing a photo-thermally sensitive black layer over a support layer;

(b) exposing a pattern of electromagnetic radiation onto the photo-thermally sensitive black layer corresponding to the desired pattern of the black matrix grid lines; and (c) peeling off the unexposed portions of the photo-thermally sensitive black layer to thereby form the grid lines.

DETAILED DESCRIPTION OF THE INVENTION

Figure 1:
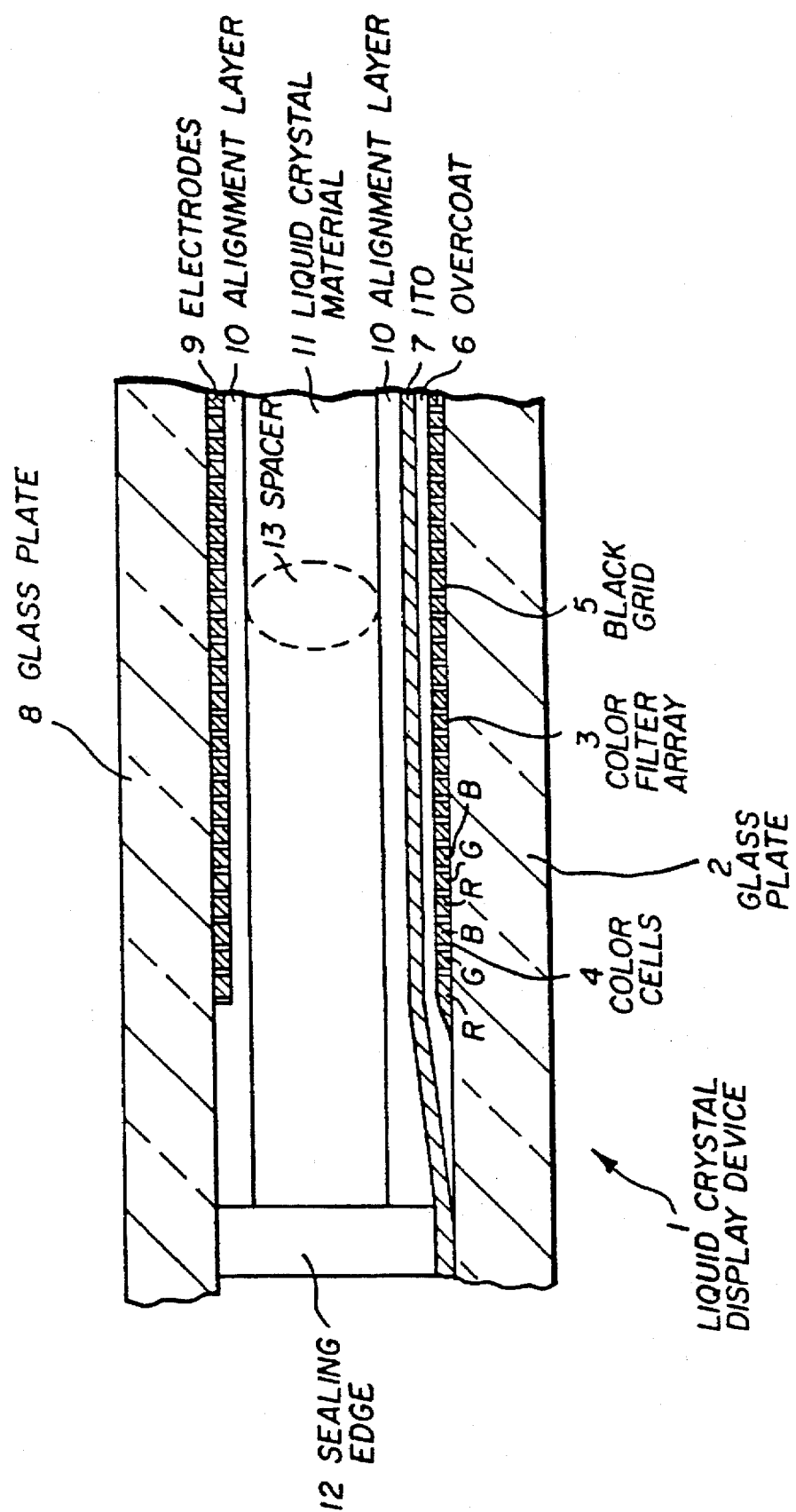
FIG. 1 is a diagrammatic view of a portion of a liquid crystal display including a color filter array in accordance with this invention.

A useful color filter array should have good thermal resistance, so that subsequent high temperature processing steps such as vacuum sputtering of conducting layers and curing of polymeric alignment layers will not degrade the color quality of the pixel elements of the array. The colorants of the pixel elements of the array should also be chosen to have good fade resistance to the viewing light that illuminates them. The colorants must have good color purity, and the overall transmisivity of the color filter array should be as high as possible, consistent with good color purity and saturation, so that the power of the illuminating lamp need not be excessively high. Additional requirements on the color filter array are that the resolution of the array be high, so that the images appear sharp and detailed to the eye, and the overall uniformity of the image be good.

The requirement of overall uniformity generally means that the overall dimensional accuracy of the color filter array must be high. In addition, point defects such as missing pixels (pixel drop-outs) must not occur in a uniform array image.

As noted above, the image receiving layer contains a repeating pattern of colorants, preferably a mosaic pattern.

In a preferred embodiment of the invention, the mosaic pattern consists of a set of red, green, and blue additive primaries. Each area of primary color and each set of primary colors are separated from each other by an opaque area, e.g., black grid lines. This has been found to give improved color reproduction and reduce flare in the displayed image.

The size of the mosaic set is not critical since it depends on the viewing distance. In general, the individual pixels of the set are from about 50 to about 600 microns and do not have to be of the same size.

One advantageous repeating mosaic pattern of colorant to form the color filter array element consists of uniform, square, linear repeating areas, with one color diagonal displacement as follows:

R G B R G B
B R G B R G
G B R G B R

In one preferred arrangement, the above squares are approximately 100 microns.

The color filter array elements prepared according to the invention can be used in image sensors or in various electro-optical devices such as electroscopic light valves or liquid crystal display devices. Such liquid crystal display devices are described, for example, in U. K. Patents 2,154,355; 2,130,781; 2,162,674; and 2,161,971.

Liquid crystal display devices are commonly made by placing a material, which is liquid crystalline at the operating temperature of the device, between two transparent electrodes, usually indium tin oxide coated on a substrate such as glass, and exiting the device by applying a voltage across the electrodes. Alignment layers are provided over the transparent electrode layers on both substrates and are treated to orient the liquid crystal molecules in order to introduce a twist of, e.g., 90 degrees, between the substrates. Thus, the plane of polarization of plane polarized light will be rotated in a 90 degree angle as it passes through the twisted liquid crystal composition from one surface of the cell to the other surface. Application of an electric field between the selected electrodes of the cell causes the twist of the liquid crystal composition to be temporarily removed in the portion of the cell between the selected electrodes. By use of optical polarizers on each side of the cell, polarized light can be passed through the cell or extinguished, depending on whether or not a electric field is applied.

The polymeric alignment layer described above can be any of the materials commonly used in the liquid crystal art. Examples of such materials include polyimides, polyvinyl alcohol, and methyl cellulose.

The transparent conducting layer described above is also conventional in the liquid crystal art. Examples of such materials include indium tin oxide, indium oxide, tin oxide, and cadmium stannate.

FIG. 1 shows diagrammatically a part of a liquid crystal display device 1 having a glass plate 2 of glass, quartz, or other suitable material. A color filter array 3 comprises red (R), green (G), and blue (B) color cells or pixel cells 4 corresponding to pixels. Black grid lines 5 separate each color cell. The color filter array 3 is provided with a polymeric protective overcoat layer 6 and a transparent conducting layer of indium tin oxide (ITO) 7.

In the color filter array of the invention the polymeric protective overcoat layer 6, which overlies the image-receiving layer that contains the colorant of the pixel elements, may be formed by photopolymerizing a layer containing a cycloaliphatic epoxide compound such as 3,4-epoxycylohexylmethyl-3,4-epoxycylohexylcarboxylate, and an onium salt of a Lewis acid as a photoinitiator, as more fully described in U.S. Pat. No. 5,166,126 the disclosure of which is incorporated herein by reference.

A glass plate 8 has electrodes 9 provided thereon which define pixels, either because electrodes 9 and the transparent conducting layer of ITO 7 constitute a cross-bar system in which the crosslinks define the pixels (passive drive), or because the electrodes 9 constitute picture electrodes which are driven by a system (not shown) of switching elements, drive, and data lines (active drive), in which case the electrodes 9 may have a single flat structure.

A layer of liquid crystal material 11, which is provided with alignment layers 10, is present between the two supporting glass plates 2 and 8. The two plates are held at a substantially constant distance from each other by means of a sealing edge 12 and spacers 13. In practice, the device is further provided with polarizers, reflectors, etc. in the conventional manner.

The colorants used in the color filter array element of the invention may comprise pigments, dyes, or dichroic layers which are colored by virtue of the interference cancellation of certain wavelengths of light. Colorant dyes are more fully described below, and the image-receiving layer may comprise, for example, those polymers described in U.S. Pat. Nos. 4,695,286; 4,740,797; 4,775,657; and 4,962,081, the disclosures of which are hereby incorporated by reference. Preferably, polycarbonates having a glass transition temperature greater than about 200 degrees C. are employed. In another preferred embodiment, polycarbonates derived from a methylene substituted bisphenol A such as 4,4'-(hexahydro-4,7-methanoindan-5-ylidene)-bisphenol are employed. In general, good results have been obtained at a coverage of from about 0.25 to about 5 mg/m$^2$.

The support used in the invention is preferably glass such as borax glass, borosilicate glass, chromium glass, crown glass, flint glass, lime glass, potash glass, silica-flint glass, soda glass, and zinc-crown glass. In a preferred embodiment, borosilicate glass is employed.

A dye-donor element that is used to form the color filter array element of a preferred embodiment of the invention comprises a support having thereupon a dye layer. Any dye or mixtures of dyes can be used in such a layer provided they are transferable to the dye image-receiving layer of the color filter array element of the invention by the action of intense light. Especially good results have been obtained with sublimable dyes. Examples of sublimable dyes include anthraquinone dyes, e.g. Sumikalon Violet RS® (Sumito Chemical Co., Ltd.); Dianix Fast Violet 3R-FS® (Mitsubishi Chemical Industries, Ltd.); and Kayalon Polyol Brilliant Blue N-BGM®; Kayalon Polyol Dark Blue 2BM®; and KST Black KR® (Nippon Kayaku Co., Ltd.); Sumickaron Diazo Black 5G® (Mitsui Toatsu Chemicals., Inc.); direct dyes such as Direct Dark Green B® (Mitsubishi Chemical Industries, Ltd.); and Direct Brown M® and Direct Fast Black D® (Nippon Kayaku Co., Ltd.); acid dyes such as Kayanol Milling Cyanine 5R® (Nippon Kayaku Co., Ltd.); basic dyes such as Sumicacryl Blue 6G® (Sumitomo Chemical Co., Ltd.); and Aizen Malachite Green® (Hodogaya Chemical Co., Ltd.); or any of the dyes disclosed in U.S. Pat. Nos. 4,541,830; 4,698,651; 4,695,287; 4,701,439; 4,757,046; 4,743,582; 4,769,360; and 4,753,922, the disclosure of which are hereby incorporated by reference.

Suitable dyes are further illustrated by the following structural formulae:

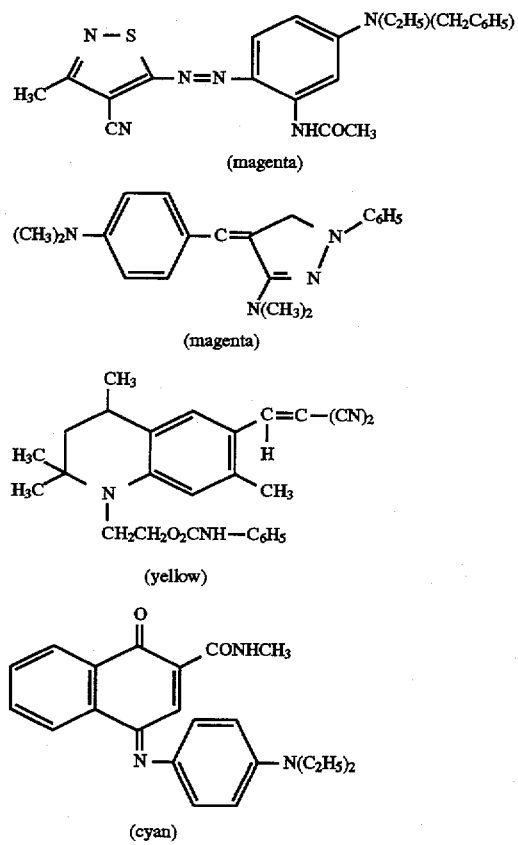

(magenta)

(magenta)

(yellow)

(cyan)

The above subtractive dyes can be employed in various combinations to obtain the desired red, blue, and green additive primary colors, as disclosed in U.S. Pat. Nos. 4,957,898; 4,975,410; and 4,988,665, the disclosures of which are hereby incorporated by reference. The dyes can be mixed within the dye layer or transferred sequentially if coated in separate dye layers and can be used at a coverage of from about 0.05 to about 1 g/m2.

Various methods can be used to transfer dye from the dye donor to the image-receiving layer on the temporary support to form the color filter array element of the invention. For example, a high intensity light flash from a xenon filled flash lamp can be used with a dye-donor containing an energy absorptive material such as carbon black or a light-absorbing dye. This method is more fully described in U.S. Pat. No. 4,923,860, the disclosure of which is incorporated herein by reference.

In another embodiment of the invention, the high intensity light is supplied by means of a laser, using a dye-donor element comprising a support having thereon a dye layer and an absorbing material for the wavelength of the laser. Whichever of these known dye transfer methods is selected for making the color filter array element of the invention, the absorption of the high intensity light causes the dyes to transfer to the receiving layer.

Any material that absorbs the laser energy or high intensity light flash described above can be used as the absorbing material, for example, carbon black or non-volatile infrared-absorbing dyes or pigments which are well known to those skilled in the art. In a preferred embodiment, cyanine infrared absorbing dyes are employed as described in U.S. Pat. No. 4,973,572, the disclosure of which is hereby incorporated by reference.

Irrespective of whether laser or flash lamps are employed to transfer the dye from the donor to the polymeric image-receiving layer, the intensity of the radiation should be high enough and the duration of the flash should be short enough that there is no appreciable heating of the assembly with concomitant significant dimension change in the pattern of color cell or pixel cells 4. The preferred duration of the flash is from 1 microsecond to 30 milliseconds. The preferred intensity of the flash is from 0.01 Watts per square micrometer to 10 Watts per square micrometer.

The black matrix grid lines that surround the color pixels of the color filter array serves several purposes. In the active drive display described above, the switching elements for each pixel are silicon based transistors, and as such are sensitive to light. The black matrix grid lines protect these elements from over exposure to light. If this protection is to be accomplished without too much loss of screen brightness, the black lines must be accurately placed to just cover the switching elements and no more. Another function of the black matrix grid lines are to define the overall uniformity of the display, by letting uniform amounts of light pass through each part of the display. This requires accurate placement of the black lines, and accurate size of the holes in the black matrix grid lines. A third function of the black matrix grid lines is to reduce reflected light from the surface of the display, thus improving contrast and color of the displayed image. This requires that the reflection optical density of the black lines be high, preferably above 3. In summary then, good black matrix grid lines have a high optical density, openings that are of uniform size and that are uniformly and accurately placed, and no bigger than necessary.

A commonly used method of preparing the black matrix grid lines for a color filter array is to evaporate photo-thermally sensitive black layer such as an opaque layer of chromium onto the glass support for the array. The chromium is then overcoated with photoresist and baked. The photoresist is exposed to a pattern of ultraviolet light corresponding to the desired color portions of the color filter array, and then the photoresist is developed in a wet solution of tetrmethylammonium hydroxide, or a similar developer, to remove the exposed portions of the photoresist. Then the chromium is etched off the glass in the exposed areas by a high vacuum plasma etch process. The remaining photoresist is then removed by a solvent wash. This process has many steps and uses expensive equipment to achieve the desired black matrix grid lines.

An improvement in the chromium black matrix has been found by conducting the initial part of the chromium evaporation in an oxygen atmosphere, so the initially deposited material is chromium oxide, which is a more black color than pure chromium. Although this reduces the flare from reflected light on the display screen, the steps of making the black matrix grid lines are equally as difficult as with pure chromium.

Because of the high reflectivity of both chromium and chromium oxide, leading to flare by reflected light on a display screen, some manufactures are turning to black matrixes made by dyed or pigmented photoresist techniques. One such material is DARC102, sold by the Brewer Science Company of Rolla, Mo. The recommended procedure for such a material is 1) spin coat the black resist at 1000 rpm for 2 minutes, 2) bake at 100 degrees for 1 minute, 3) bake at 150 degrees for 30 minutes, 4) overcoat with positive photoresist by spinning at 2500 rpm for 2 minutes, 5) bake at 100 degrees for 1 minute, 6) expose to the pattern with ultraviolet light, 7) develop in positive resist developer for 30 seconds, 8) wash with water, and 9) bake at 150 degrees for 5 minutes. The many steps and critical temperature controls make this process difficult and expensive.

Black matrix grid lines in accordance with this invention are prepared by coating the color receiving layer with a photo-thermally sensitive black layer, exposing the photo-thermally sensitive black layer to a high intensity pattern of light corresponding to the desired black lines of the black matrix grid lines, and peeling off the unexposed parts of the photo-thermally sensitive black layer. The short number of simple steps distinguish this method of making a black matrix from the methods previously described.

The photo-thermally sensitive black layer includes a black colorant and an optional binder which is useful when the black colorant does not form a continuous film by itself. In a preferred embodiment of the invention the colorant is carbon black and the binder is nitrocellulose. The carbon black is dispersed in particles of 1 micron or less in size, and the ratio of carbon to nitrocellulose is in the range from 10 to 1 on the high side and 1 to 10 on the low side. More preferably, the ratio of carbon to nitrocellulose is 1 to 1. The photo-thermally sensitive black layer is coated at a level that gives an optical density of about 3.0 to visible light.

It should be noted that the term "black" as used in this invention refers to the common notion of black. In actual fact, there may be no perfect black in nature, because every black material has subtle shades of color when observed closely. Carbon, commonly called black, is, when coated in thin layers, an obvious shade of brown, because it absorbs more light in the blue end of the spectrum than it does in the red end of the spectrum. However, when coated to an optical density of 3.0, it will appear to the vast majority of observers to be a dark and rich shade of black.

The choice of binders for the photo-thermally sensitive black layer is limited to those combinations of binder and colorant that will give a layer that will peel off the color receiver layer in unexposed areas. In general, this means the surface energy of the photo-thermally sensitive black layer should be about at least 30 dynes per centimeter different from (higher or lower) the color receiver layer. In a preferred embodiment of the invention, where the color receiver layer is 4,4'-(hexahydro-4,7-methanoindan-5-ylidene)-bisphenol, a preferred photo-thermally sensitive black layer consisting of equal amounts of nitrocellulose and carbon black will peel cleanly and easily from the surface of the color receiver layer. A less preferred photo-thermally sensitive black layer such as an equal mixture of carbon black and Butyvar B76 (Monsanto) will peel from the surface of the color receiver layer only with difficulty.

The flash exposure of the photo-thermally sensitive black layer through a mask with openings to pass light where the black lines of the matrix are desired is accomplished with same high intensity flash lamp described above in the section on preparing a color filter array. The effect of the flash is to fuse the exposed portions of the photo-thermally sensitive black layer into the dye receiving layer, so they are not subsequently peeled off the surface.

The peeling of the unexposed portions of the photo-thermally sensitive black layer is facilitated by laminating the black surface with a layer of adhesive tape, and then peeling off the adhesive tape which carries off the unexposed portions of the photo-thermally sensitive black layer, leaving the desired flash exposed grid lines of the black matrix on the color receiving polymer layer.

After the black matrix has been prepared, the color pixels may be prepared by the flash dye transfer method described above.

This surface may then be coated with any required protective overcoat, followed by the transparent conductive layer and the polymeric alignment layer.

An example of a black matrix element prepared by this method is described below.

EXAMPLE

A 63 mm square of glass, 1.4 mm thick, was spin coated at 2000 rpm with a 15% solution of 4,4'-(hexahydro-4,7-methanoindan-5-ylidene)bisphenol polycarbonate in anisole for 1 minute. To complete drying of the solvent, the glass was placed on a hot plate at 60 degrees C. for 1 minute. The plate was overcoated with a dispersion of 5% carbon black and 5% nitrocellulose in butyl acetate by spinning at 2000 rpm for 1 minute. Then a chrome mask with 30×90 micron lines corresponding to the desired black matrix lines of a color filter array was placed in contact with the photo-thermally sensitive black layer, and pressure was applied to hold the assembly firmly in contact. The assembly was exposed to a high intensity xenon flash through the chrome mask. The chrome mask was removed, and the unexposed portions of the photo-thermally sensitive black layer were removed with adhesive tape, revealing a uniform black matrix of lines, with clean, clear spaces for the subsequent color pixels.

The invention has been described in detail with particular reference to certain preferred embodiments thereof, but it will be understood that variations and modifications can be effected within the spirit and scope of the invention.

PARTS LIST 1 liquid crystal display device
2 glass plate
3 color filter array
4 color cells or pixel cells
5 black grid lines
6 polymeric protective overcoat layer
7 ITO transparent conducting layer
8 glass plate
9 electrodes
10 alignment layer
11 liquid crystal material
12 sealing edge
13 spacers

What is claimed is:

1. A method of making black matrix grid lines for a color filter array for use with a display device, comprising the steps of:
    (a) providing a photo-thermally sensitive black layer over a support layer;
    (b) exposing a pattern of electromagnetic radiation onto the photo-thermally sensitive black layer corresponding to the desired pattern of the black matrix grid lines wherein the black sensitive layer is colored by carbon particles of one micron or less in size dispersed in a binder; and
    (c) peeling off the unexposed portions of the photo-thermally sensitive black layer to thereby form the grid lines.

2. The method of claim 1 wherein the binder is nitrocellulose.

3. The method of claim 1 wherein the support layer includes 4-4'-(hexahydro-4,7-methanoindan-5-ylidene) bisphenol polycarbonate.

4. The method of claim 1 wherein the exposing step is provided by flash exposure.

* * * * *